(12) United States Patent
Sawayama et al.

(10) Patent No.: US 12,190,073 B2
(45) Date of Patent: Jan. 7, 2025

(54) INTERNAL STATE MODIFYING DEVICE

(71) Applicant: NTT DOCOMO, INC., Chiyoda-ku (JP)

(72) Inventors: Atsuki Sawayama, Chiyoda-ku (JP); Hosei Matsuoka, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 277 days.

(21) Appl. No.: 17/599,861

(22) PCT Filed: Dec. 27, 2019

(86) PCT No.: PCT/JP2019/051481
§ 371 (c)(1),
(2) Date: Sep. 29, 2021

(87) PCT Pub. No.: WO2020/225942
PCT Pub. Date: Nov. 12, 2020

(65) Prior Publication Data
US 2022/0207243 A1    Jun. 30, 2022

(30) Foreign Application Priority Data

May 7, 2019   (JP) ................................ 2019-087471

(51) Int. Cl.
*G06F 40/44* (2020.01)
*G06F 40/47* (2020.01)
*G06F 40/58* (2020.01)

(52) U.S. Cl.
CPC .................. *G06F 40/44* (2020.01)

(58) Field of Classification Search
CPC ........... G06F 40/44; G06F 40/47; G06F 40/58
USPC ......................................................... 704/2, 8
See application file for complete search history.

(56) References Cited

U.S. PATENT DOCUMENTS

2019/0114545 A1* 4/2019 Lee ........................... G06N 3/08

FOREIGN PATENT DOCUMENTS

WO    WO 2006/134759 A1   12/2006

OTHER PUBLICATIONS

International Search Report issued on Mar. 10, 2020 in PCT/JP2019/051481 filed on Dec. 27, 2019, 2 pages.
International Preliminary Report on Patentability and Written Opinion issued Nov. 18, 2021 in PCT/JP2019/051481, 5 pages.

* cited by examiner

*Primary Examiner* — George C Monikang
(74) *Attorney, Agent, or Firm* — Oblon, McClelland, Maier & Neustadt, L.L.P.

(57) ABSTRACT

To easily construct a translation model environment in which the sentences of a plurality of second languages corresponding to a sentence of a first language can be generated. An internal state changing device 1 includes a change unit 13 configured to change an internal state that is a final hidden state of an encoder, in a translation model that is a learned model constituted by an encoder-decoder model, as the translation model for translating an original sentence that is a sentence of a first language into a translated sentence that is a sentence of a second language.

8 Claims, 8 Drawing Sheets

*Fig.6*

```
Encoder_final_state = Encoder_hidden_state(t)
cell, Encoder_final_state = LSTM(cell, Encoder_hidden_state(t-1), word_embed(xt))
Noise = generate_noise()
Encoder_state_with_noise = add_noise(Encoder_final_state, Noise)
Decoder_init_state = Encoder_state_with_noise
cell, Decoder_state(init +1) = LSTM(cell, Decoder_init_state, word_embed(EOS))
```

INTERNAL STATE MODIFYING DEVICE

TECHNICAL FIELD

One aspect of the present disclosure relates to an internal state changing device for changing an internal state of a learned model that translates a sentence of a first language into a sentence of a second language.

BACKGROUND ART

Patent Literature 1 below discloses a sentence evaluation device that evaluates an answer sentence translated into a predetermined language for a question sentence.

CITATION LIST

Patent Literature

Patent Literature 1: International Unexamined Patent Publication No. 2006/134759

SUMMARY OF INVENTION

Technical Problem

For example, a composition scoring technology that scores a translation result of a person who translates a given English sensation into a Japanese sensation often performs evaluation by allowing a system to internally generate a model answer in advance and to compare the model answer with the translation result of the person. However, the translation result of the person often contains various expressions, words, and phrases, and even if the sentence meaning is the same, the model answer generated by the system may be significantly different, and therefore, it is not possible to perform appropriate scoring. Therefore, it is conceivable to manually prepare a plurality of Japanese sentences corresponding to one English sentence as a model answer in advance, which is expensive and time-consuming, and is not easy.

Therefore, one aspect of the present disclosure is made in view of such problems, and an object of the present disclosure provides an internal state changing device capable of easily constructing a translation model environment in which a sentence of a plurality of second languages corresponding to a sentence of a first language can be generated.

Solution to Problem

In order to solve the above problems, an internal state changing device according to one aspect of the present disclosure includes a change unit configured to change an internal state that is a final hidden state of an encoder, in a translation model that is a learned model constituted by an encoder-decoder model, as the translation model for translating an original sentence that is a sentence of a first language into a translated sentence that is a sentence of a second language.

According to such an internal state changing device, it is possible to easily generate the plurality of translation models in which the internal state is changed. By inputting the sentence of the first language to each of the plurality of generated translation models, it is possible to generate the sentences of the plurality of second languages corresponding to the sentence of the first language. That is, it is possible to easily construct the translation model environment in which the sentences of the plurality of second languages corresponding to the sentence of the first language can be generated.

Advantageous Effects of Invention

According to one aspect of the present disclosure, it is possible to easily construct the translation model environment in which the sentences of the plurality of second languages corresponding to the sentence of the first language can be generated.

BRIEF DESCRIPTION OF DRAWINGS

FIG. 6 is a diagram illustrating a program example for changing the internal state.

DESCRIPTION OF EMBODIMENTS

Hereinafter, an embodiment of an internal state changing device will be described in detail with reference to the drawings. In the description of the drawings, the same elements will be denoted by the same reference symbols, and a redundant description thereof will be omitted. Further, the embodiments in the following description are specific examples of the present invention, and unless specifically stated to the effect that the invention is to be limited, the present invention is not limited to these embodiments.

Figure 1:
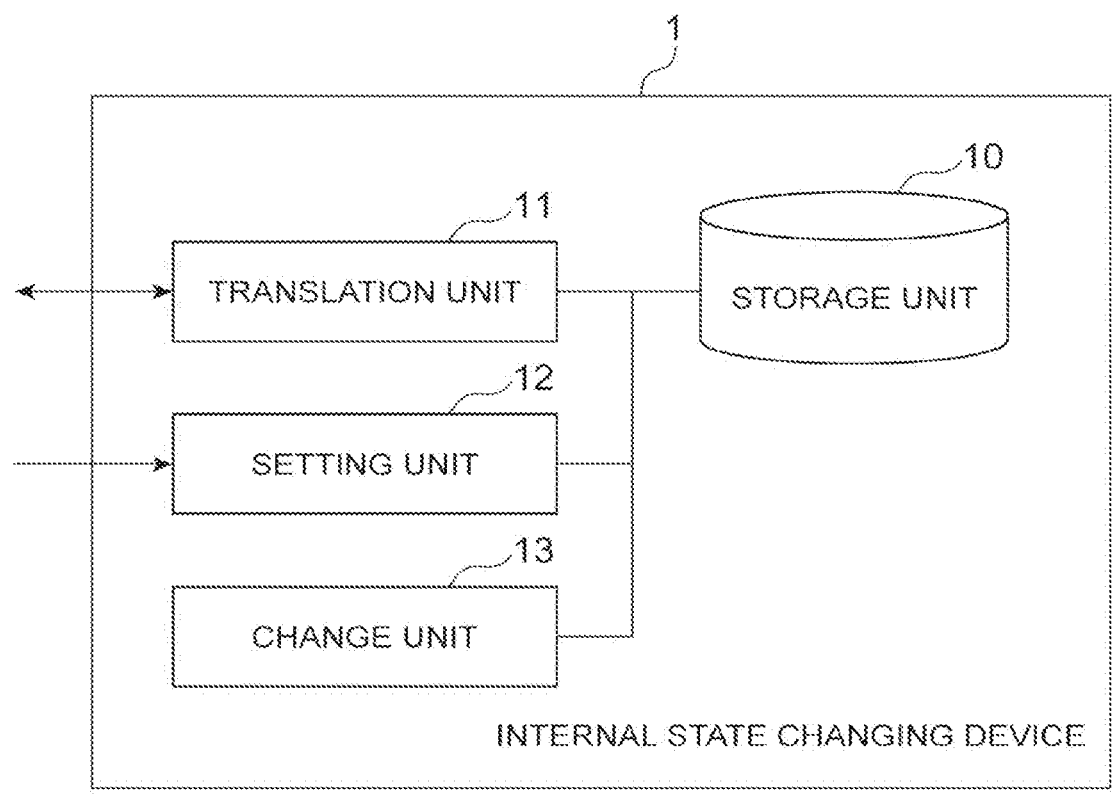
FIG. 1 is a functional block diagram of an internal state changing device according to an embodiment of the present invention.

FIG. 1 is a functional block diagram of an internal state changing device 1 according to an embodiment of the present invention. As illustrated in FIG. 1, the internal state changing device 1 is configured to include a storage unit 10, a translation unit 11, a setting unit 12, and a change unit 13.

It is assumed that each functional block of the internal state changing device 1 functions in the internal state changing device 1, but is not limited thereto. For example, a part of the functional blocks (for example, the storage unit 10 and the translation unit 11) of the internal state changing device 1 are a server device different from the internal state changing device 1, and may function while appropriately transmitting and receiving information to and from the internal state changing device 1, in the server device network-connected to the internal state changing device 1. In addition, a part of the functional blocks of the internal state changing device 1 may not be present, a plurality of functional blocks may be integrated into one functional block, or one functional block may be decomposed into the plurality of functional blocks.

Hereinafter, each functional block of the internal state changing device 1 illustrated in FIG. 1 will be described.

The storage unit 10 stores various data used in various processes performed by the internal state changing device 1. Various data stored in the storage unit 10 are appropriately referenced and updated by each functional block in various processes performed by the internal state changing device 1.

The storage unit 10 stores a translation model that is a learned model constituted by an encoder-decoder model (alias: encoder-decoder translation model, sequence to sequence model), as the translation model for translating an original sentence (input sentence) that is a sentence of a first language (source language) into a translated sentence (output sentence) that is a sentence of a second language.

The first language is, for example, English, but may be any other languages. The second language is a language different from the first language, for example, Japanese, but may be any other languages. The first language and the second language may be different local dialects (for example, standard language and Kansai dialect in Japan). The language is not limited to a natural language, and may be an artificial language, a formal language (computer program language), or the like. A sentence is a unit of a language expression that is governed by a single statement that is completed in form. A sentence may be replaced with a sentence (for example, paragraph, sentence, and the like) composed of one or more sentences.

The learned model is a model generated by learning by machine learning and is a combination of a computer program and a parameter. In addition, the learned model is a combination of a structure of a neural network and a parameter (weighting coefficient) that is connection strength between respective neurons of the neural network. Further, the learned model is a command to a computer, and is one combined so as to be able to obtain one result (executes a predetermined process), that is, a computer program that causes the computer to function.

Figure 2:
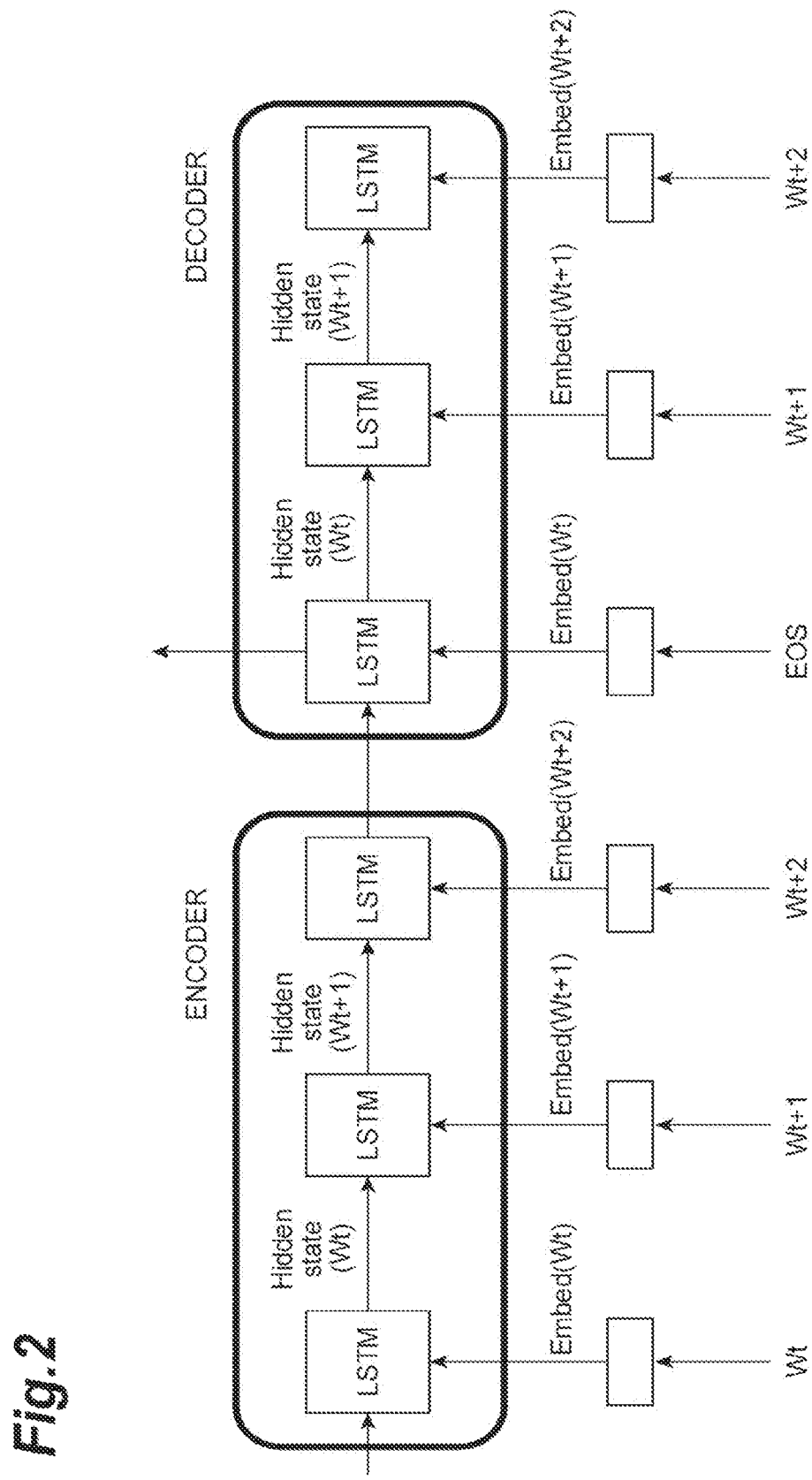
FIG. 2 is a conceptual diagram of a translation model.

FIG. 2 is a conceptual diagram of a translation model. As illustrated in FIG. 2, the translation model is mainly constituted by an encoder and a decoder. In the present embodiment, each of the encoder and the decoder is a recurrent neural network called long short term memory (LSTM). The LSTM is assumed to be a 2-layer LSTM. In addition, it is assumed that the translation model uses an attention mechanism. The translation model is also a neural machine translator.

The encoder inputs the sentence of the first language and outputs the (final) hidden state (internal state). More specifically, the encoder divides the sentence of the first language into words by morphological analysis or the like, converts word IDs corresponding to each word into word vectors (vectors of an input layer) and then inputs the word vectors sequentially (in the order of first word $Wt$ of the sentence, next word $Wt+1$, next word $Wt+2$, . . . , and last word $Wt+n$), and sequentially outputs the hidden state (of the vector) based on input contents up to that point (performs calculation of a neural network). When the encoder inputs "end of sentence (EOS)" indicating an end of a sentence, the hidden state (of the vector) based on the input contents up to that point, that is, the final hidden state is output from the encoder to the decoder (value is delivered from the encoder to the decoder). Conceptually, it can be said that the encoder semantically analyzes an original sentence of the first language and extracts semantic expression (the meaning of the original sentence is compressed).

When the decoder inputs the hidden state (of the vector) output from the encoder, the decoder outputs a vector of an output layer corresponding to a first word of the second language sentence finally output based on the input hidden state (of the vector). The vector of the output layer is information indicating a list of word candidates of the second language and likelihoods of the word candidates. Thereafter, a process of extracting, for example, a word with maximum likelihood among the word candidates indicated by a vector of an output layer of an Nth word (N is an integer of 1 or more), inputting the extracted word to a self decoder, and outputting a vector of an output layer of a (N+1)th word based on the hidden state (of the vector) used when outputting the input word and the vector of the output layer of the Nth word is repeated until the last word of the sentence of the second language. Conceptually, it can be said that the decoder generates the sentence (of the second language different from the first language) from the semantic expression extracted by the encoder.

As described above, in FIG. 2, a final state of the encoder and an initial state of the decoder are the same. On the other hand, when the internal state is changed by the change unit 13 described later, the final state of the encoder and the initial state of the decoder are not the same.

The translation model stored by the storage unit 10 may be input from another device via a network, or may be generated by a translation model generation unit (not illustrated) that is included in the internal state changing device 1 and generates the translation model. In addition, the storage unit 10 may store a plurality of translation models. In that case, each translation model is associated with translation model identification information that uniquely identifies the translation model, and in each process in the internal state changing device 1, by designating the translation model identification information together, an appropriate process is performed for the corresponding translation model.

The translation unit 11 translates the input original sentence into the translated sentence using the translation model stored by the storage unit 10. More specifically, the translation unit 11 receives the input of the original sentence and applies the input original sentence to the translation model stored by storage unit 10 to acquire the translated sentence output from the translation model and output (or display) the acquired translated sentence to another functional block, a user of the internal state changing device 1, or another device via a network. The translation timing by the translation unit 11 may be periodical, may be instructed by the user of the internal state changing device 1, or may be instructed by another device via the network.

The translation unit 11 may output the translated sentence and output information about translation quality (or translation accuracy) that is quality as the translation result of the translated sentence which is output when the translation by the translation model is performed.

The translation quality is more specifically a translation probability, or a language probability, or both the translation probability and the language probability. In general, the higher the translation probability and the lower the language probability, the higher the quality of the translated sentence is (the higher the confidence in the translated sentence generated by machine translation is).

The translation probability is a probability of how many word strings are output to output the entire translated sentence from the original sentence. The translation probability may be a probability of a word string of the translated sentence with respect to a word string of the original sentence. The translation probability may be a value obtained by summing likelihoods output for each word of the translated sentence over the entire translated sentence when the translation unit 11 performs the machine translation. The translation probability is, for example, a value of "PRED AVG SCORE" output when OpenNMT (official site "http://opennmt.net/"), which is an open-source neural machine translation system, performs the machine translation.

The language probability is a probability (probability of the next word when looking at the previous word) of how often the word string is generated when looking at the word string of the translated sentence. The language probability may be a probability that an arbitrary word string of the translated sentence is generated. The translation probability is, for example, the value of the "PRED PPL" output when the OpenNMT performs the machine translation.

The translation unit 11 may output a translated sentence obtained by translating the original sentence by using a translation model including an internal state changed by the change unit 13 described later.

The setting unit 12 sets a numerical value range. A numerical value is assumed to be a real number, but is not limited thereto. An example of the numerical value range is "0" or more and less than "1". The numerical value range is, for example, a range in which a random number (scalar value) used when changing the internal state of the translation model as described later is generated. That is, the numerical value range is also called a random number generation range. As the numerical value range increases, the internal state of the translation model is greatly changed by the change unit 13, and the phrase or the like of the translated sentence translated from the original sentence is greatly changed by the internal state. On the other hand, as the numerical value range decreases, the internal state of the translation model is changed small by the change unit 13, and the phrase or the like of the translated sentence translated from the original sentence is changed small by the internal state. The setting unit 12 outputs the set numerical value range to the change unit 13. The setting timing of the numerical value range by the setting unit 12 may be periodical, may be instructed by the user of the internal state changing device 1, or may be instructed from another device via the network.

The setting unit 12 may set the numerical value range based on the translation result of the translation using the translation model (after determining the translation result). The original sentence used for translation using the translation model may be prepared in advance by the user or the like of the internal state changing device 1 to set the numerical value range. Hereinafter, some specific patterns for a method for setting a numerical value range will be described. These patterns may be used alone or in combinations.

(Pattern 1)

The setting unit 12 may set the numerical value range based on a length (sentence length) of the translated sentence translated using the translation model. That is, the translation result may be the length of the translated sentence that is translated using the translation model. The reason for focusing on the sentence length is that in the machine translation, the longer the length of the original sentence and the length of the translated sentence, the higher the possibility that the translation accuracy will decrease. For example, the setting unit 12 may widen the numerical value range (than the predetermined numerical value range) as the length of the translated sentence is short (than a predetermined length (average sentence length or the like)) and may narrow the numerical value range (than the predetermined numerical value range) as the length of the translated sentence is long (than a predetermined length (average sentence length or the like)). The setting unit 12 may be widened or narrowed depending on the length of the translated sentence. Further, the setting unit 12 may set the numerical value range based on an average, a variance, a standard deviation, and the like of a sentence length of a corpus of the second language in learning data (parallel translation corpus).

(Pattern 2)

The setting unit 12 may set the numerical value range based on the translation quality (or translation accuracy) that is the quality of the translated sentence translated using the translation model. That is, the translation result may be the translation quality that is the quality of the translated sentence that is translated using the translation model. The reason for focusing on the translation quality is that the accuracy at the time of translation can be grasped from the value of the translation probability. For example, the setting unit 12 may widen the numerical value range (than the predetermined numerical value range) when the translation quality is higher than the predetermined quality (for example, the translation probability of translated sentence is higher than the predetermined probability), and narrow the numerical value range (than the predetermined numerical value range) when the translation quality is lower than the predetermined quality (for example, the translation probability of the translated sentence is lower than the predetermined probability). The setting unit 12 may widen or narrow the numerical value range depending on the degree of quality. Further, the setting unit 12 may set the numerical value range based on the likelihoods (word quality and accuracy) of each word of the translated sentence output from the translation unit 11. More specifically, the setting unit 12 may set the numerical value range based on the number of words having a likelihood higher than a predetermined likelihood among words configuring the translated sentence. Further, the setting unit 12 may set the numerical value range depending on the quality of the sentence based on the quality of each word of the translated sentence output from the translation unit 11.

(Pattern 3)

The setting unit 12 may set the numerical value range based on a comparison between the translated sentence obtained by translating the original sentence using the translation model and correct answer data (reference translation) of the second language corresponding to the original sentence. The correct answer data is, for example, a translation result of a person having a high level of translation skill who translates the original sentence of the first language into the second language. The correct answer data may be a translation result output as a translated sentence with respect to the original sentence by another translation device that performs high-quality translation, not by a person. The correct answer data used by the setting unit 12 may be acquired by the setting unit 12 from another device via the network, or may be input by the user of the internal state changing device 1. For example, the setting unit 12 may set the numerical value range based on word (vocabulary) matching rate or a sentence length difference between the translated sentence and a reference translation. More specifically, the setting unit 12 may widen the numerical value range (than the predetermined numerical value range) as the word matching rate is high or the sentence length difference is small (since learning is going well), and may narrow the numerical value range as the word matching rate is low or the sentence length difference is large (since learning is not going well). Further, the setting unit 12 may set the numerical value range based on a comparison between the likelihoods of each word of the translated sentence output from the translation unit 11 and the reference translation. More specifically, the setting unit 12 may calculate how many reference translation words are included in a higher ranking of the likelihoods of each word of the translated sentence output from the translation unit 11 (words higher than the predetermined likelihood), widen the numerical value range (than the predetermined numerical value range) as the more words of the reference translation are included (since learning is going well), and narrow the numerical value range (than the predetermined numerical value range) as the smaller words of the reference translation are included (since learning is not going well).

The translation model used by the setting unit 12 may be the translation model including the internal state changed by the change unit 13. More specifically, the translation model used by the setting unit 12 in each pattern described above may be a translation model stored by the storage unit 10 having the internal state changed by the change unit 13 described later.

The change unit 13 changes the internal state (that is the final hidden state) of the encoder in the translation model. More specifically, the change unit 13 changes the internal state of the encoder in the translation model stored by the storage unit 10, and causes the storage unit 10 to store the translation model including the changed internal state. The change unit 13 may change the internal state based on the random number. The change unit 13 may change the internal state based on the numerical value (random number) included in the numerical value range set (input) by the setting unit 12. The change unit 13 may generate one or more numerical values (random number) included in the numerical value range set (input) by setting unit 12, and generate the plurality of changed internal states (each generated numerical values), in which the internal state is changed based on each numerical value for one internal state. Further, the change unit 13 may multiply the random number by a reciprocal of the sentence length based on the sentence length of the translated sentence output from the translation unit 11. The change timing of the internal state by the change unit 13 may be periodical, may be instructed by the user of the internal state changing device 1, or may be instructed by another device via the network.

Figure 3:
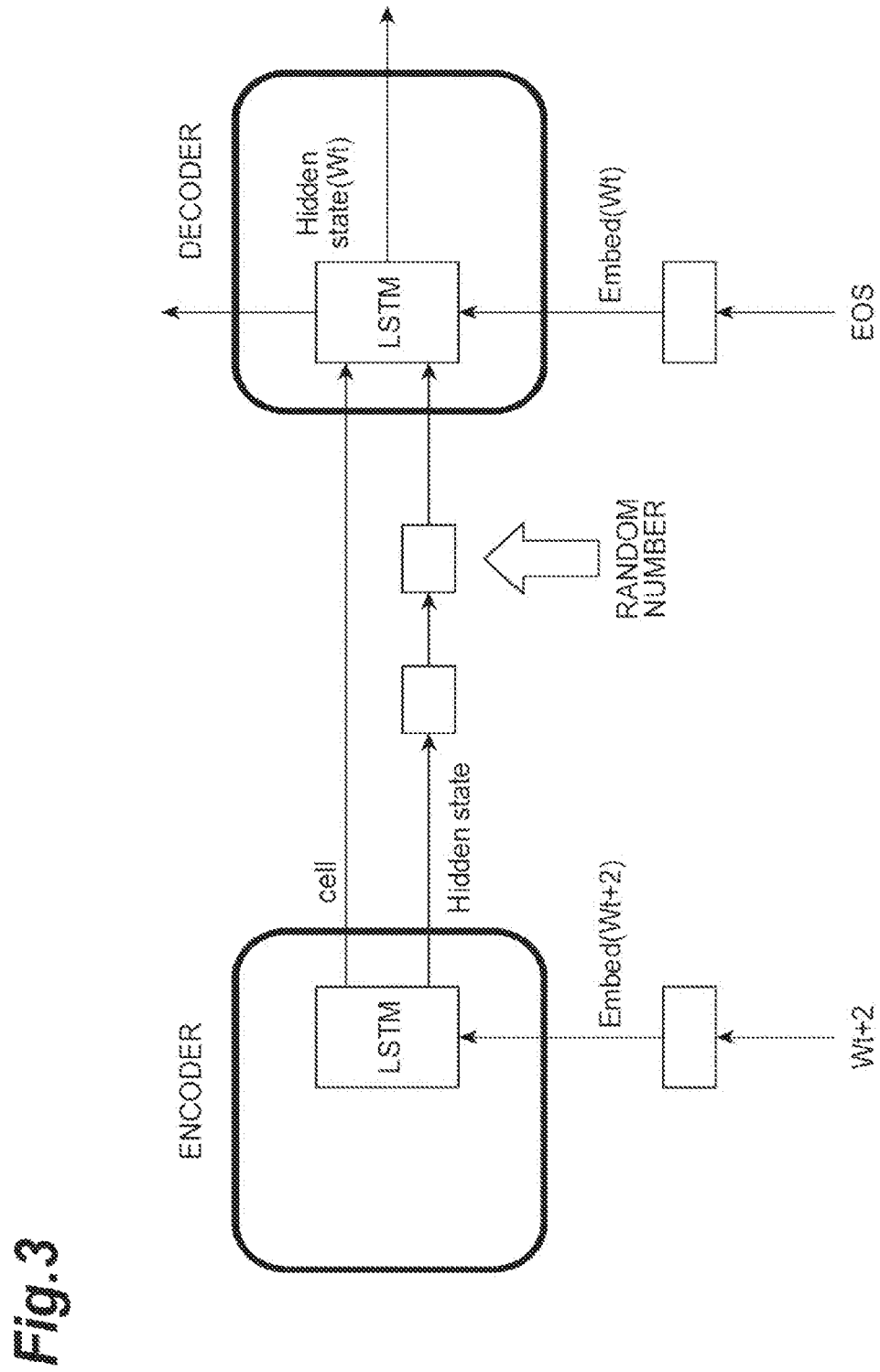
FIG. 3 is a conceptual diagram illustrating a scene in which a random number is added to an internal state of the translation model.

FIG. 3 is a conceptual diagram illustrating a scene in which the random number is added to the internal state of the translation model (a scene in which the internal state is changed by change unit 13). FIG. 3 is an enlarged view of an area between the encoder and the decoder in the conceptual diagram of the translation model illustrated in FIG. 2, and an area except for the vicinity is illustrated omitted. As illustrated in FIG. 3, a cell output from the encoder is input to the decoder as it is, whereas the hidden state (internal state) output from the encoder is input to the decoder after the random number is added by the change unit 13. That is, the initial state of the decoder is the same as the final state of the encoder to which the random number is added.

Figure 4:
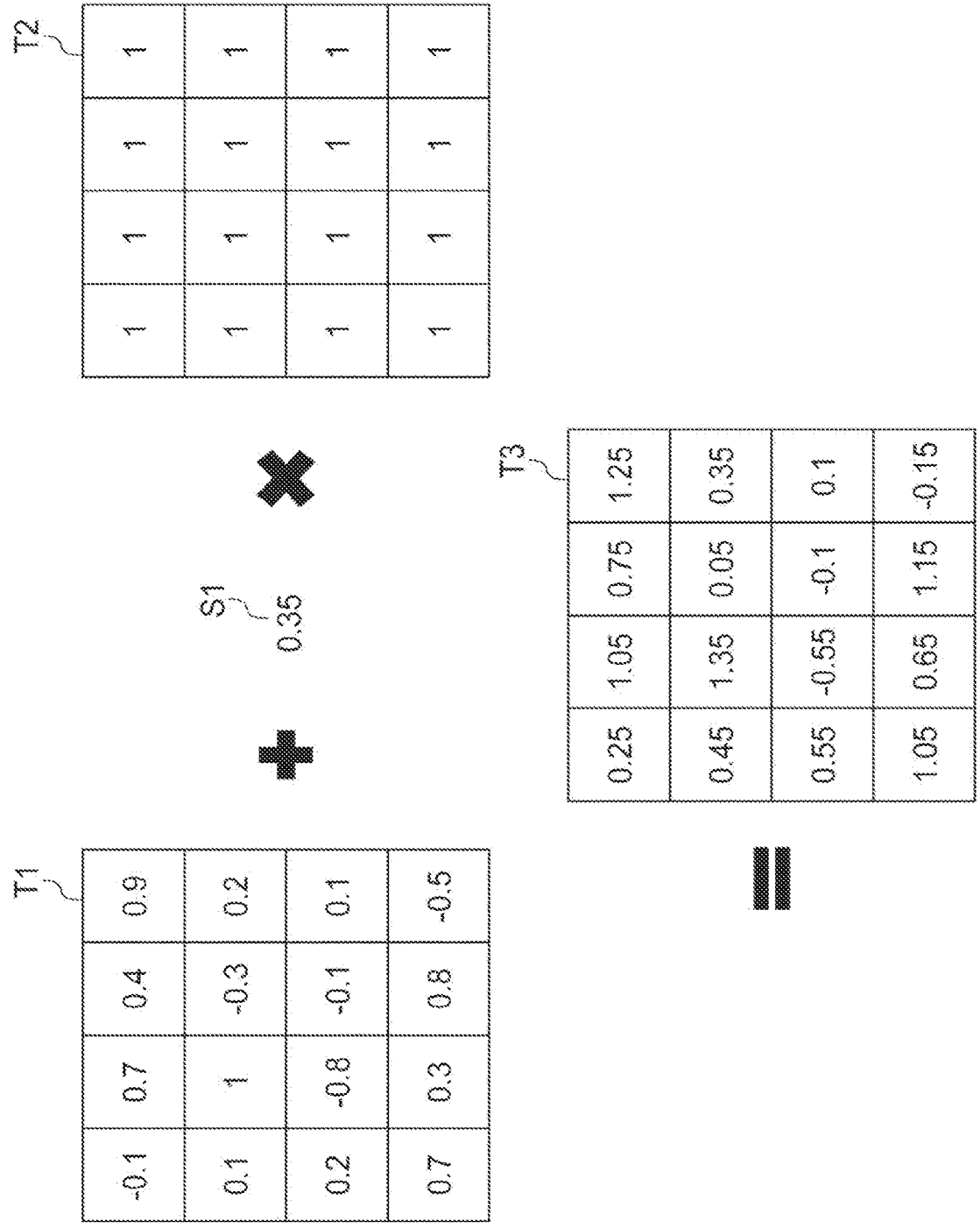
FIG. 4 is a diagram illustrating an example of adding the random number to the internal state.

FIG. 4 is a diagram illustrating an example of adding the random number to the internal state by the change unit 13. A matrix T1 in FIG. 4 indicates the final hidden state of the encoder. A row of the matrix T1 indicates a hidden size, and a column of the matrix T1 indicates an embedded size. When the matrix T1 is input, the change unit 13 generates a random number S1 (matrix of a scalar value) based on the numerical value range set by the setting unit 12. Next, the change unit 13 generates a matrix T2 that has the same size as the matrix T1 and all elements initialized to "1". Next, the change unit 13 multiplies the random number S1 by the matrix T2. Next, the change unit 13 adds the multiplied result and the matrix T1 to obtain a matrix T3. The obtained matrix T3 is the internal state changed by the change unit 13, and is the initial value of the hidden state of the decoder.

When the random number is assigned to each matrix value of the matrix T1, the semantic expression of the matrix (internal state) may be destroyed. As in the example illustrated in FIG. 4, by adding the same random number value to each matrix value, it is possible to shift the random number in the same direction without destroying the state of the semantic expression of the internal state to some extent.

Figure 5:
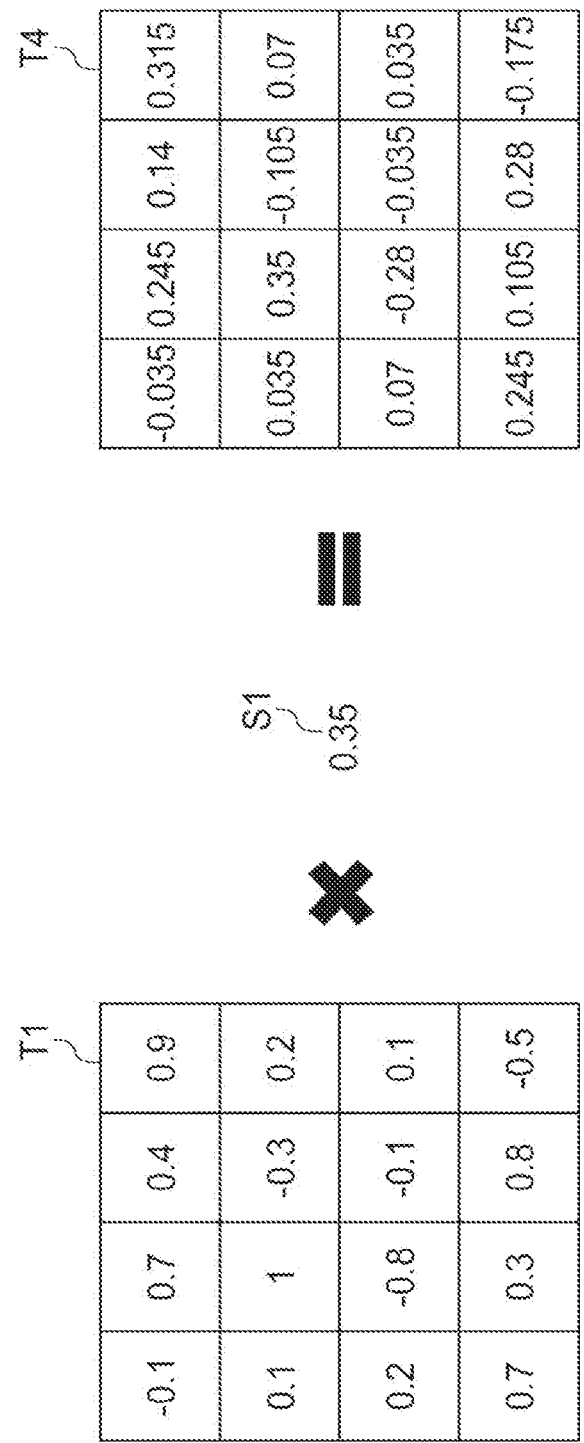
FIG. 5 is a diagram illustrating another example of adding the random number to the internal state.

FIG. 5 is a diagram illustrating an example of adding the random number to the internal state by the change unit 13. The matrix T1 in FIG. 5 indicates the final hidden state of the encoder. When the matrix T1 is input, the change unit 13 generates the random number S1 based on the numerical value range set by the setting unit 12. Next, the change unit 13 multiplies the random number S1 by the matrix T1 to obtain a matrix T4. The obtained matrix T4 is the internal state changed by the change unit 13, and is the initial value of the hidden state of the decoder. That is, the change unit 13 increases or decreases the hidden state itself of the encoder.

FIG. 6 is a diagram illustrating a program example for changing the internal state. In the program example illustrated in FIG. 6, "t" indicates the time when the last word of the original sentence is input, and "x" indicates a word ID of the word. The program example illustrated in FIG. 6 can also be used in a recurrent neural network (RNN). In bi-directional LSTM, which is a stack of layers of LSTM, it is also possible to add a random number with variation such as adding a random number to only one side.

Figure 7:
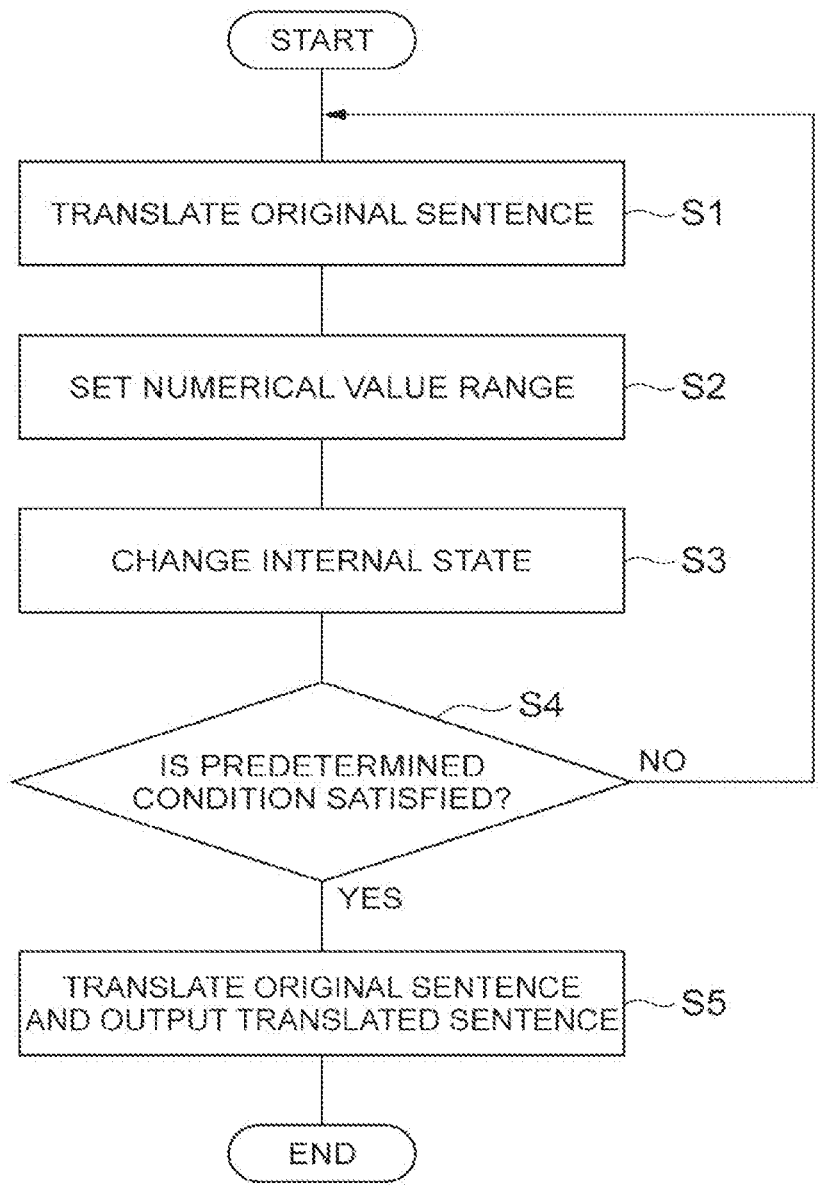
FIG. 7 is a flowchart illustrating an internal state changing process executed by the internal state changing device according to the embodiment of the present invention.

Next, the process of changing the internal state executed by the internal state changing device 1 according to the present embodiment will be described using the flowchart illustrated in FIG. 7.

First, the translation unit 11 translates the original sentence using the translated sentence stored by storage unit 10 (step S1). Next, the setting unit 12 sets the numerical value range based on the translation result in S1 (step S2). Next, the change unit 13 changes the internal state based on the numerical value included in the numerical value range set in S2 (step S3), and the storage unit 10 stores the translation model including the changed internal state. Next, the internal state changing device 1 (or change unit 13) determines whether or not a predetermined condition is satisfied (step S4). The predetermined condition is, for example, whether or not the number of loops of the processes of S1 to S4 has reached a predetermined number. Further, for example, the predetermined condition is whether or not the translation quality of the translated sentence by the translation using the translation model including the internal state changed in S3 satisfies the predetermined quality. When the predetermined condition is satisfied in S4 (S4: YES), the translation unit 11 translates the original sentence using the translation model including the internal state changed in S3, and outputs the translated sentence (step S5). On the other hand, when the predetermined condition is not satisfied in S4 (S4: NO), the process returns to S1. In the process in S1 when returning to S1, the original sentence may be translated using the translation model including the internal state changed in S3.

Next, the action and effect of the internal state changing device 1 configured as in the present embodiment will be described.

According to the internal state changing device 1 of the present embodiment, the change unit 13 changes the internal state. By doing so, it is possible to easily generate the plurality of translation models with changed internal state. By inputting the original sentence of the first language to each of the plurality of generated translation models, it is possible to generate the translated sentences of the plurality of second languages corresponding to the original sentence of the first language. That is, it is possible to easily construct the translation model environment in which the translated sentences of the plurality of second languages corresponding to the original sentence of the first language can be generated.

In addition, according to the internal state changing device 1 of the present embodiment, the change unit 13 changes the internal state based on the random number. As a result, it is possible to easily change the internal state with a relatively simple configuration.

Further, according to the internal state changing device 1 of the present embodiment, the setting unit 12 sets the numerical value range, and the change unit 13 changes the internal state based on the numerical value included in the numerical value range set by the setting unit 12. As a result, it is possible to adjust the degree of change flexibly and appropriately in the internal state in the numerical value range.

Further, according to the internal state changing device 1 of the present embodiment, the setting unit 12 sets the numerical value range based on the translation result of the translation using the translation model. As a result, it is possible to adjust the degree of change flexibly and appropriately in the internal state based on the translation result.

In addition, according to the internal state changing device 1 of the present embodiment, the translation result may be the length of the translated sentence translated using the translation model. As a result, it is possible to flexibly and appropriately adjust the degree of change in the internal state based on the length of the translated sentence. Generally, the longer the translated sentence, the worse the translation accuracy may be. That is, it is possible to adjust the degree of change flexibly and appropriately in the internal state based on the translation accuracy.

In addition, according to the internal state changing device 1 of the present embodiment, the translation result may be the translation quality that is the quality of the translated sentence translated using the translation model. As a result, it is possible to appropriately adjust the degree of change in the internal state based on the translation quality.

According to the internal state changing device 1 of the present embodiment, the setting unit 12 widens the numerical value range when the translation quality is higher than the predetermined quality, or narrows the numerical value range when the translation quality is lower than the predetermined quality. As a result, it is possible to appropriately adjust the degree of change in the internal state based on the low and high of the translation quality.

In addition, according to the internal state changing device 1 of the present embodiment, the setting unit 12 may set the numerical value range based on a comparison between the translated sentence obtained by translating the original sentence using the translation model and correct answer data of the second language corresponding to the original sentence. As a result, it is possible to appropriately adjust the degree of change in the internal state based on the comparison of the translated sentence and the correct answer data.

In addition, according to the internal state changing device 1 of the present embodiment, the translation model used by the setting unit 12 may be the translation model including the internal state changed by the change unit 13. As a result, the numerical value range can be set based on the internal state changed by the change unit 13, and the internal state can be changed based on the set numerical value range. That is, since the internal state can be repeatedly changed based on the previous state, the internal state can be changed more appropriately.

Further, according to the internal state changing device 1 of the present embodiment, the translation unit 11 outputs the translated sentence obtained by translating the original sentence using the translation model including the internal state changed by the setting unit 12. As a result, it is possible to easily generate a parallel translation sentence of the original sentence and the output translated sentence.

The internal state changing device 1 of the present embodiment relates to a composition question creation and composition scoring system that converts the sentence of the first language such as English into the sentence of the second language such as Japanese and causes a person to convert the sentence of the first language into the second language to score the translation accuracy. The internal state changing device 1 of the present embodiment is also a one-to-many parallel translation sentence creation system.

Conventionally, for example, there is composition scoring technology in which a user such as a student or a worker learning Japanese translates a document written in English into Japanese and scores the answer accuracy. In such composition scoring technology, scoring is often realized by internally generating a model answer in advance and comparing the model answer with the translation result of the person. In such a case, a freely created sentence often contains various expressions, words, and phrases, and even if the sentence meaning is the same, the model answer generated by the scoring system and the reference sentence prepared in advance, the phrase, and the like may be significantly different, so the scoring result of the system may be significantly different even though the sentence meaning is correctly created and the sentence is written using a proper grammar. Therefore, it is necessary for the scoring system to be able to properly score a free sentence input by the user.

As described above, in the case of the above-mentioned prior art, since the learning by the machine translation is learned from a one-to-one parallel translation sentence and the learning is not performed by preparing various phrases, the scoring accuracy is lowered. That is, there is a possibility that the scoring can be solved by preparing sentences of various second language for one first language sentence. However, there is a problem in that manually creating high-quality parallel translation sentences with various different phrases is expensive and is difficult to create in large quantities. The internal state changing device 1 of the present embodiment is made to solve such a problem, and an object of the present embodiment realizes a composition scoring system capable of generating a high-quality one-to-many parallel translation, using the one-to-many parallel translation for re-learning of a scoring system, and flexibly scoring various user input sentences by using the parallel translation sentence prepared as the model answer and creating the sentences on the second language side input by the user in large quantities.

The internal state changing device 1 of the present embodiment may include the following configuration as a modified example. That is, the internal state changing device 1 includes a machine translation unit configured to convert an input sentence created in a first language into a second language, a translation accuracy confirmation unit configured to determine whether a translation result using the machine translation unit is appropriate and whether the translation accuracy is high, a unit configured to determine a random number generation range from the translation result, a unit configured to adjust a random number generation range when the translation accuracy is low, a unit configured to adjust a random number generation range and compare a translated sentence of a second language with a reference translation of an original sentence of the first language when the translation accuracy is high, and a unit configured to generate the random number satisfying the determined random number generation range, and has an ability to add the generated random number to the internal state of the machine translation unit to which the original sentence is input, assigns a plurality of random numbers to generate a translated sentence of a high-quality second language having a plurality of different phrases, and outputs one-to-many parallel translation sentence. The machine translation unit may be an RNN, a bi-directional RNN, or a generator constituted by other neural networks. Further, the machine translation unit may be constituted by an encoder-decoder model. Further, the random number assignment may be assigned to the final hidden state of the encoder.

In addition, the internal state changing device 1 of the present embodiment may include the following configuration as a modified example. That is, a machine translation device including a machine translation unit that translates a sentence created in a first language into a sentence in a second language includes a data receiving unit configured to receive a sentence created in the first language, a division unit configured to divide a received character string into a morpheme unit, a translation accuracy determination unit configured to determine accuracy of the sentence translated from the first language into the second language, a random number range determination unit configured to determine a random number generation range from a sentence translated into the second language, a comparison and determination unit configured to compare and determine the sentence translated into the second language and a reference translation translated into the second language of the first language, a random number adjustment unit configured to adjust a random number range from the translation accuracy and the comparison and determination result, a random number generation unit configured to generate the random number from the adjustment range, and a random number assignment unit configured to assign the generated random number to the internal state of the generator inputting the sentence of the first language.

As described above, according to the internal state changing device 1 of the present embodiment, when the sentence of the first language is machine-translated for each of the plurality of random numbers, by adjusting the noise generation range from the accuracy of the result of the second language sentence translated without adding the random number, the translated second language sentence, and the reference translation of the first language in addition to generating the plurality of sentences translated into the second language and creating sentences of various phrases, it is possible to instantly create high-quality second language sentences with different phrases, and by learning the composition scoring system using the plurality of reference translations of the second language with different phrases, it is possible to more flexibly score the input sentence of the user.

In the composition scoring system for Japanese and the like, in order to flexibly score various user inputs, it is conceivable to cause the language side input by the user to learn the scoring system using a one-to-many parallel translation sentence written in the plurality of phrases. However, it takes manpower and costs to create the parallel translation sentence using the plurality of phrases. In the internal state changing device 1 of the present embodiment, the sentence scoring system enables more flexible scoring by utilizing the learned machine translation model and generating high-quality translated language sentences written in various phrases.

In the automatic scoring system for composition using machine learning, when the user performs the input having the same meaning as the answer but different phrases, there is a problem in that when the scoring system does not learn a similar phrase at the time of learning, the score is greatly reduced and proper scoring cannot be done. In order to solve this problem, it is considered that the language side input by the user performs learning using a one-to-many parallel translation sentence written in the plurality of phrases. However, it takes manpower and costs to create the parallel translation sentence written in the plurality of phrases.

In the internal state changing device 1 of the present embodiment, by utilizing the parallel translation sentence prepared as the model answer, imparting appropriate noise calculated from the information on the reference translation of the translated language side and the information on the translated sentence to the internal state of the translation model in which the sentence of the first language is compressed by the number of generations, and generating the translated sentence, the high-quality one-to-many parallel translation is generated and the generated parallel translations are used for re-learning of the scoring system.

In the automatic scoring system of Japanese composition, since the sentences input by the user are diverse, the score tends to decrease when the meaning is similar but the phrase is different. From this, in a correction system using the translation model, it is necessary to construct a translation model capable of performing "various translations" instead of using a translation model capable of performing "optimal translation". According to the internal state changing device 1 of the present embodiment, it is possible to perform more flexible (hard to reduce accuracy) scoring for user input sentences. The internal state changing device 1 of the present embodiment is a device that utilizes the learned translation model to generate "high-quality one-to-many parallel translation data". According to the internal state changing device 1 of the present embodiment, the translation accuracy can be expected to be improved by using the one-to-many parallel translation data created for the re-learning of the scoring model.

In the internal state changing device 1 of the present embodiment, the final hidden state (internal state, h) in which the source sentence is input is used as a reference for the encoder of the learned translation model. In the internal state changing device 1 of the present embodiment, the random number whose amount of change is within a predetermined standard deviation is generated from the average and the deviation and added to the internal state.

In the internal state changing device 1 of the present embodiment, by increasing or decreasing the value of the internal state, the sentence generated from the translation model decoder including the internal state is changed, or the meaning of the sentence of the original sentence changes a little.

Note that the block diagrams illustrated in the description of the above-described embodiments show blocks of functional units. Those functional blocks (structural components) can be realized by any combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 8:
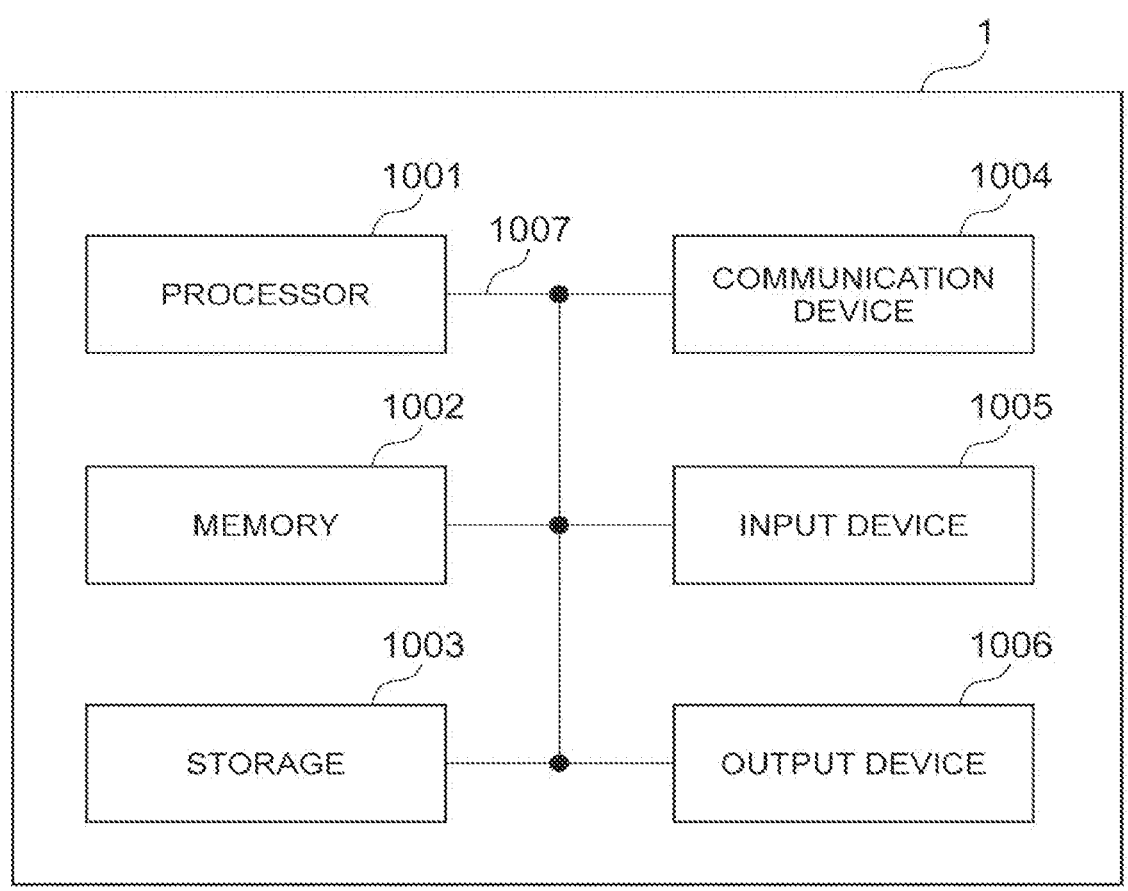
FIG. 8 is a hardware configuration diagram of the internal state changing device according to the embodiment of the present invention.

For example, the internal state changing device 1 or the like in the embodiment of the present disclosure may function as a computer that performs the process of the internal state changing method of the present disclosure. FIG. 8 is a diagram illustrating an example of a hardware configuration of the internal state changing device 1 according to the embodiment of the present disclosure. The above-described internal state changing device 1 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. The hardware configuration of the internal state changing device 1 may be configured to include one or plurality of the devices illustrated in the drawings, or may be configured not to include a part of the devices.

Each function of the internal state changing device 1 is realized by causing a processor 1001 to perform computation by loading a predetermined software (program) on hardware such as the processor 1001 and the memory 1002, and by controlling communication via the communication device 1004 or controlling reading and/or writing of data on the memory 1002 and the storage 1003.

The processor 1001 operates, for example, an operating system to control the entire computer. The processor 1001 can be configured with a central processing unit (CPU) including an interface with a peripheral device, a control device, a computing device, a register, and the like. For example, the translation unit 11, the setting unit 12, the change unit 13, and the like described above may be realized by the processor 1001.

Moreover, the processor 1001 reads a program (program code), a software module, data, and the like from at least one of the storage 1003 and the communication device 1004 into the memory 1002, and executes various processes according to the data. As the program, a program that is capable of executing on the computer at least a part of the operation explained in the above embodiments is used. For example, the storage unit 10, the translation unit 11, the setting unit 12, and the change unit 13 may be realized by a control program stored in the memory 1002 and operating in the processor 1001, and the other functional blocks may be realized similarly. It has been described that various processes described above can be executed by one processor 1001, but various processes can be executed simultaneously or sequentially by two or more processors 1001. The processor 1001 can be implemented by using one or more chips. Alternatively, the program can be transmitted from a network via a telecommunication line.

The memory 1002 is a computer readable recording medium and is configured, for example, with at least one of a read only memory (ROM), an erasable programmable ROM (EPROM), an electrically erasable programmable ROM (EEPROM), a random access memory (RAM), and the like. The memory 1002 can be called register, cache, main memory (main memory device), and the like. The memory 1002 can store therein a program (program code), software modules, and the like that can execute the wireless communication method according to the embodiment of the present disclosure.

The storage 1003 is a computer readable recording medium. Examples of the storage 1003 can include at least one of an optical disk such as a compact disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including at least one of the memory 1002 and the storage 1003, a server, or other appropriate medium.

The communication device 1004 is hardware (transmission/reception device) capable of performing communication between computers via at least one of a wired and wireless network. The communication device 1004 is also called, for example, a network device, a network controller, a network card, a communication module, and the like. The communication device 1004 includes a high-frequency switch, a duplexer, a filter, a frequency synthesizer, and the like in order to realize, for example, at least one of frequency division duplex (FDD) and time division duplex (TDD). For example, the translation unit 11, the setting unit 12, the change unit 13, and the like described above may be realized by the communication device 1004.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be constituted by a single bus or can be constituted by separate buses between the devices.

Further, the internal state changing device 1 is configured to include hardware such as a microprocessor, a digital signal processor (DSP), an application specific integrated circuit (ASIC), a programmable logic device (PLD), and a field programmable gate array (FPGA). Some or all of these functional blocks may be realized by the hardware. For example, the processor 1001 may be implemented by using at least one of these hardware.

Notification of information is not limited to the aspect/embodiment described in the present disclosure, and may be performed by using a different method.

As long as there is no inconsistency, the order of processing procedures, sequences, flowcharts, and the like of each of the above aspects/embodiments in the present disclosure may be exchanged. For example, the various steps and the sequence of the steps of the methods described in the present disclosure are exemplary and are not limited to the specific order mentioned above.

The input/output information can be stored in a specific location (for example, a memory) or can be managed in a management table. The information to be input/output can be overwritten, updated, or added. The output information and the like may be deleted. The input information or the like can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in the present disclosure and terms necessary for understanding the present disclosure may be replaced by terms having the same or similar meanings.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure.

The terms "determining" as used in the present disclosure may encompass a wide variety of operations. The "determining" can include, for example, considering performing judging, calculating, computing, processing, deriving, investigating, looking up, search, or inquiry (for example, searching in a table, a database, or another data structure), or ascertaining as performing the "determining". In addition, the "determining" can include considering performing receiving (for example, receiving information), transmitting (for example, transmitting information), input, output, or accessing (for example, accessing data in a memory) as performing the "determining". In addition, the "determining" can include considering performing resolving, selecting, choosing, establishing, or comparing as performing the "determining". That is, the "determining" can include considering some operation as performing the "determining". In addition, the "determining" may be replaced with "assuming", "expecting", "considering", and the like.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency region, the microwave region and light (both visible and invisible) regions, and the like.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

The "means" in the configuration of each of the above devices may be replaced with a "unit", a "circuit", a "device", and the like.

In the present disclosure, the used terms "include", "including", and variants thereof are intended to be inclusive in a manner similar to the term "comprising". Furthermore, the term "or" used in the present disclosure is intended not to be an exclusive disjunction.

Throughout the present disclosure, for example, during translation, if articles such as "a", "an", and "the" in English are added, in the present disclosure, these articles shall include plurality of nouns following these articles.

In the present disclosure, the term "A and B are different" may mean "A and B are different from each other". It should be noted that the term may mean "A and B are each different from C". Terms such as "leave", "coupled", or the like may also be interpreted in the same manner as "different".

REFERENCE SIGNS LIST

1 Internal state changing device
10 Storage unit
11 Translation unit
12 Setting unit
13 Change unit

The invention claimed is:

1. A translation device comprising:
an internal state changing device; and
a generating device,
the internal state changing device comprising processing circuitry configured to:
 change an internal state that is a final hidden state of an encoder, in a translation model that is a learned model constituted by an encoder-decoder model, as the translation model for translating an original sentence that is a sentence of a first language into a translated sentence that is a sentence of a second language,
 change the internal state based on a random number,
 set a numerical value range, and
 change the internal state in multiple ways based on a numerical value included in the set numerical value range, and
the generating device comprising processing circuitry configured to:
 input a desired original sentence into each of multiple translation models generated by the internal state changing device, and
 generate multiple translated sentences in the second language corresponding to the desired original sentence.

2. The translation device according to claim 1, wherein the processing circuitry of the internal state changing device sets the numerical value range based on a translation result of a translation using the translation model.

3. The translation device according to claim 2, wherein the translation result is a length of the translated sentence that is translated using the translation model.

4. The translation device according to claim 2, wherein the translation result is a translation quality that is a quality of the translated sentence that is translated using the translation model.

5. The translation device according to claim 4, wherein the processing circuitry of the internal state changing device widens the numerical value range when the translation quality is higher than a predetermined quality, or narrows the numerical value range when the translation quality is lower than a predetermined quality.

6. The translation device according to claim 1, wherein the processing circuitry of the internal state changing device sets the numerical value range based on a comparison between the translated sentence obtained by translating the original sentence using the translation model and correct answer data of the second language corresponding to the original sentence.

7. The translation device according to claim 2, wherein the translation model includes the changed internal state.

8. The translation device according to claim 1, wherein the processing circuitry of the internal state changing device is further configured to:
 output the translated sentence obtained by translating the original sentence using the translation model including the changed internal state.

* * * * *